United States Patent [19]

Butterfield et al.

[11] Patent Number: 5,002,023

[45] Date of Patent: Mar. 26, 1991

[54] VARIABLE CAMSHAFT TIMING FOR INTERNAL COMBUSTION ENGINE

[75] Inventors: Roger P. Butterfield, Interlaken; Franklin R. Smith, Slaterville Springs, both of N.Y.

[73] Assignee: Borg-Warner Automotive, Inc., Sterling Heights, Mich.

[21] Appl. No.: 422,353

[22] Filed: Oct. 16, 1989

[51] Int. Cl.$^5$ .............................................. F01L 1/34
[52] U.S. Cl. .............................. 123/90.15; 123/90.17; 123/90.31
[58] Field of Search ............... 423/90.12, 90.13, 90.15, 423/90.17, 90.31; 464/2

[56] References Cited

U.S. PATENT DOCUMENTS

| | | | |
|---|---|---|---|
| 2,861,557 | 11/1958 | Stolte | 123/90.15 |
| 3,721,220 | 3/1973 | Garcea | 123/90.15 |
| 4,131,096 | 12/1978 | Mitchell | 123/90.15 |
| 4,305,352 | 12/1981 | Oshima et al. | 123/90.15 |
| 4,494,495 | 1/1985 | Nakamura et al. | 123/90.15 |
| 4,494,496 | 1/1985 | Nakamura et al. | 123/90.15 |
| 4,498,431 | 2/1985 | Nakamura et al. | 123/90.15 |
| 4,561,390 | 12/1985 | Nakamura et al. | 123/90.15 |
| 4,601,266 | 7/1986 | Oldfield et al. | 123/90.15 |
| 4,627,825 | 12/1986 | Bruss et al. | 123/90.15 |
| 4,685,429 | 8/1987 | Oyaizu | 123/90.15 |
| 4,708,101 | 11/1987 | Hara et al. | 123/90.17 |
| 4,714,057 | 12/1987 | Wichart | 123/90.15 |
| 4,723,517 | 2/1988 | Frost | 123/90.15 |
| 4,726,331 | 2/1988 | Oyaizu | 123/90.15 |
| 4,744,338 | 5/1988 | Sapienza, IV | 123/90.15 |
| 4,747,375 | 5/1988 | Williams | 123/90.15 |
| 4,771,742 | 9/1988 | Nelson et al. | 123/90.15 |
| 4,787,345 | 11/1988 | Thoma | 123/90.15 |
| 4,802,376 | 2/1989 | Stidworthy | 123/90.15 |
| 4,805,566 | 2/1989 | Ampferer | 123/90.15 |
| 4,805,571 | 2/1989 | Humphrey | 123/90.15 |
| 4,895,113 | 1/1990 | Speier et al. | 464/2 |

FOREIGN PATENT DOCUMENTS 0134011 9/1989 Japan .................................. 123/90.17

OTHER PUBLICATIONS

May 1984 Automotive Engineering article entitled, "Variable Valve Timing has Electronic Control".
Paper entitled, "System for Automotic Variation of Phase Between Two Camshafts Inserted into a 'Cassette' Module with Sachs-Huret Chain", believed to have been originally presented in or about 1983.

Primary Examiner—David A. Okonsky
Assistant Examiner—Weilun Lo
Attorney, Agent, or Firm—Willian Brinks Olds et al.

[57] ABSTRACT

A variable camshaft timing arrangement for an internal combustion engine in which a camshaft, for example, an intake valve operating camshaft in a dual camshaft system, is advanced or retarded in its position relative to the crankshaft and to the exhaust valve operating camshaft in reaction to torque pulsations in such intake valve operating camshaft. The other camshaft of the dual camshaft engine has a sprocket oscillatingly mounted thereon. The other camshaft also has a bracket or another sprocket keyed thereto and the bracket or another sprocket is chain driven by the rotation of the crankshaft. A pair of single acting hydraulic cylinders interconnect the oscillating sprocket and the bracket or other sprocket, with the piston ends of the cylinders pivotably attached to the oscillating sprocket and with the body ends of the cylinders pivotably attached to the other sprocket or bracket. The cylinders act in opposite directions and are hydraulically interconnected so that one extends as the other retracts and vice versa. The hydraulic system includes a control valve which is controlled by an engine controller to selectively permit one of the cylinders to extend, and the other to retract, in reaction to torque pulsations in the camshaft which is being advanced or retarded to provide desired engine operating characteristics. The bracket or other sprocket whose position is phase adjustable in this manner is connected by a chain to a sprocket which is keyed to the intake valve operating camshaft. An adaptation of the system to the synchronous phase adjustment of the positions of both camshafts of a dual camshaft engine is also specifically disclosed.

30 Claims, 12 Drawing Sheets

VARIABLE CAMSHAFT TIMING FOR INTERNAL COMBUSTION ENGINE

FIELD OF THE INVENTION

This invention relates to an internal combustion engine in which the timing of the camshaft of a single camshaft engine, or the timing of one or both of the camshafts of a dual camshaft engine, relative to the crankshaft is varied to improve one or more of the operating characteristics of the engine.

BACKGROUND OF THE INVENTION

It is known that the performance of an internal combustion engine can be improved by the use of dual camshafts, one to operate the intake valves of the various cylinders of the engine and the other to operate the exhaust valves. Typically, one of such camshafts is driven by the crankshaft of the engine, through a sprocket and chain drive or a belt drive, and the other of such camshafts is driven by the first, through a second sprocket and chain drive or a second belt drive. Alternatively, both of the camshafts can be driven by a single crankshaft powered chain drive or belt drive. It is also known that engine performance in an engine with dual camshafts can be further improved, in terms of idle quality, fuel economy, reduced emissions or increased torque, by changing the positional relationship of one of the camshafts, usually the camshaft which operates the intake valves of the engine, relative to the other camshaft and relative to the crankshaft, to thereby vary the timing of the engine in terms of the operation of its intake valves relative to its exhaust valves or in terms of the operation of its valves relative to the position of the crankshaft. Heretofore, such changes in engine valve timing have been accomplished by a separate hydraulic motor operated by engine lubricating oil. However, this actuating arrangement consumes significant additional energy and it increases the required size of the engine lubricating pump because of the required rapid response time for proper operation of the camshaft phasing actuator. Further, these arrangements are typically limited to a total of 20° of phase adjustment between crankshaft position and camshaft position, and typically such arrangements are two-position arrangements, that is, on, or fully phase adjusted as one position, or off, or no phase adjustment, as a second position. The present invention is designed to overcome these problems associated with prior art variable camshaft timing arrangements by providing a self-actuating, variable camshaft timing arrangement which does not require external energy for the operation thereof, which does not add to the required size of the engine lubricating pump to meet transient hydraulic operation requirements of such variable camshaft timing arrangement, which provides for continuously variable camshaft to crankshaft phase relationship within its operating limits, and which provides substantially more than 20° of phase adjustment between the crankshaft position and the camshaft position.

SUMMARY OF THE INVENTION

The present invention provides a phase adjustment arrangement for an internal combustion engine in which the position of the camshaft, or the positions of one or both of the camshafts in a dual camshaft system, is phase adjusted relative to the crankshaft, that is, in which the camshaft is advanced or retarded relative to the crankshaft by an actuating arrangement which is controlled, for example, by a microprocessor, to control one or more important engine operating characteristics, such as idle quality, fuel economy, emissions, or torque. The actuating arrangement utilizes a pair of oppositely acting hydraulic cylinders to advance or retard the angular position of a camshaft relative to the crankshaft. Hydraulic fluid, in the form of engine oil, is transferred between the oppositely acting cylinders in reaction to changes in torque loads which are experienced by a camshaft as each of its lobes changes its angle of contact with the cam follower of the valve lifter of the engine which is operated thereby. Such flow between the hydraulic cylinders is either blocked or permitted in one direction by a control valve and check valves, and the operation of the control valve is controlled by the engine control microprocessor, to ensure that the advancing or retarding of the position variable camshaft only occurs when desired. Because the flow of hydraulic oil between the cylinders results from changes in torque experienced by one of the camshafts, no separate pump or other actuating device is required. Further, because the camshaft which is advanced or retarded is advanced or retarded by moving hydraulic fluid which is already within one or another of the oppositely acting cylinders to the other, this hydraulic fluid, engine oil in the preferred embodiment, does not have to flow through the main lubricating pump during the short time interval in which the phase adjustment must take place. Thus, the variable camshaft timing arrangement does not require the use of a significantly larger engine oil lubricating pump than would otherwise be required, and the actuation rate of the variable camshaft timing arrangement is not limited by the capacity of the engine oil pump.

Accordingly, it is an object of the present invention to provide an improved variable camshaft timing arrangement for an internal combustion engine. More particularly, it is an object of the present invention to provide a variable camshaft timing arrangement which is self-actuating and which does not add to the peak load pumping requirements of the engine lubricating pump. It is also an object of the present invention to provide a variable camshaft timing arrangement in which the position of a camshaft is continuously variable relative to the position of the crankshaft within its operating limits.

For a further understanding of the present invention and the objects thereof, attention is directed to the drawing and the following brief description thereof, to the detailed description of the preferred embodiment, and to the appended claims.

DETAILED DESCRIPTION OF THE PREFERRED EMBODIMENT

Figure 1A:
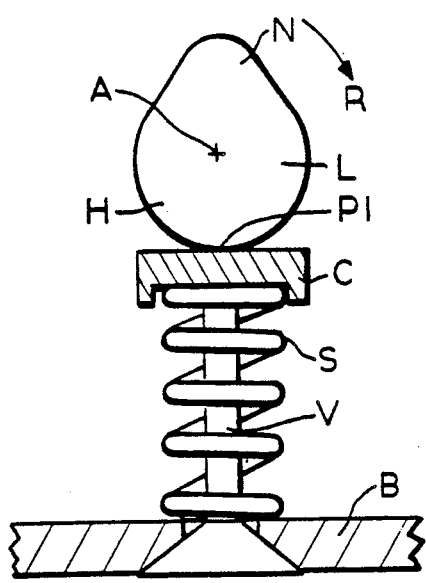
FIGS. 1A through 1D are schematic views illustrating the contact between a lobe of a camshaft and a cam follower of an engine valve at various times during a complete rotation of the camshaft.

FIGS. 1A through 1D illustrate the interaction which occurs in an operating internal combustion engine between a camshaft lobe L and a contactor C of a valve V during the rotation of the lobe L, illustratively in a clockwise direction as indicated by the arrow R, as the contactor C is urged against the lobe L by a spring S which is trapped between the contactor C and the engine block B. The lobe L has a semicircular heel portion H and a protruding nose portion N. When the contact between the contactor C and the lobe L occurs at a point P1 on the heel portion H of the lobe L, the force exerted on the lobe L by the contactor C and the spring S which urges it against the lobe L will act along a line through the axis of rotation A of the lobe L and in the direction of movement of the valve V, and will result in no torque load being imposed on the camshaft. This condition is illustrated in FIG. 1A.

Figure 1B:
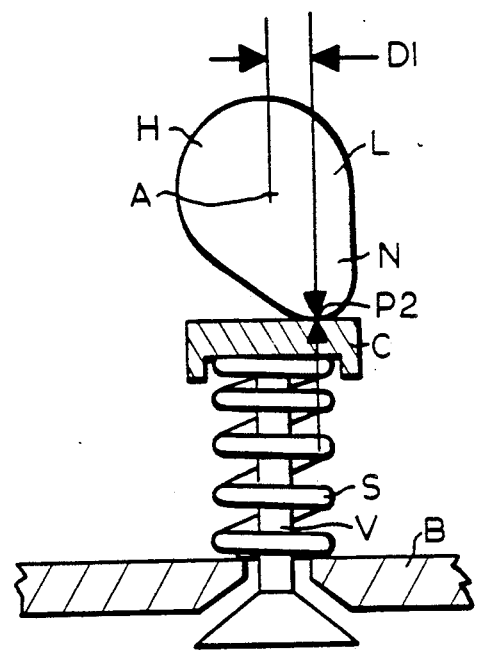
Figure 1C:
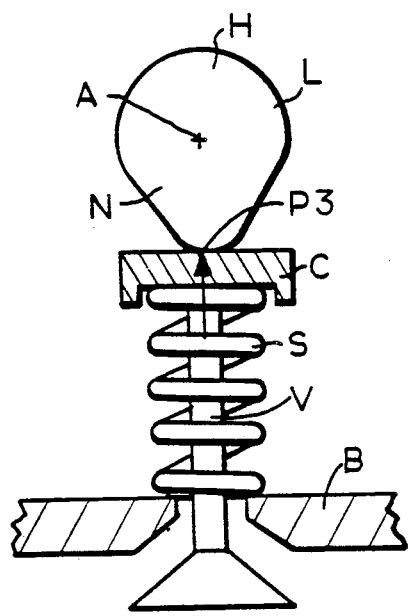
Figure 1D:
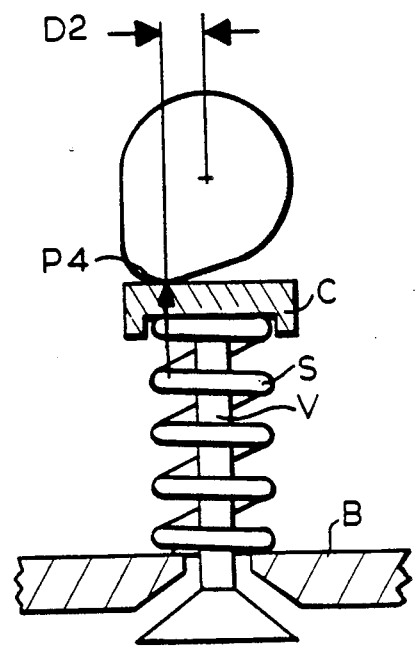
Figure 2:
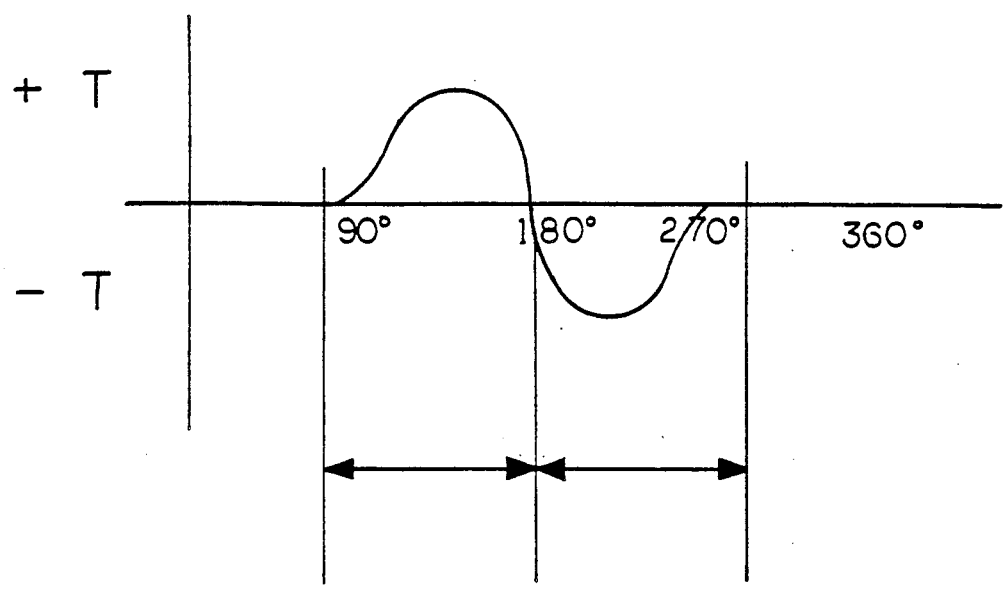
FIG. 2 is a graph which illustrates the changes in torque experienced by a camshaft as a result of changes in the contact between a lobe of the camshaft and a cam follower of an engine valve, of the type illustrated in FIGS. 1A through 1D.

As the rotation of the lobe L continues in the clockwise direction from the position illustrated in FIG. 1A, eventually the nose N of the lobe L will contact the contactor C at a point P2 on the nose portion N. The point P2 is offset in a given direction from the line through the axis of rotation A and the direction of movement of the valve V by a distance D1, as is illustrated in FIG. 1B. At this position of the lobe L a torque will be imposed on the camshaft in amount of a force F1 which acts on the contactor C as a result of the spring S multiplied by the distance D1. Eventually, during the further rotation of the lobe L and as is illustrated in FIG. 1D, the nose portion N of the lobe L will contact the contactor C at a point P4 which is one the opposite side of the axis of rotation A from the point P2 and which is spaced from the line through the axis of rotation A and the direction of movement of the valve V by distance D2. At this position of the lobe L a torque will be imposed on the camshaft in the amount of a force F2 which acts on the contactor C multiplied by the distance D2, which will be a negative amount in relation to the distance D1. Thus, the camshaft torque in the FIG. 1D position of the lobe L is oppositely directed with respect to the camshaft torque in the FIG. 1B position. As the lobe L moves from the FIG. 1B position to the FIG. 1D position it will pass through the FIG. 1C position in which there will be zero torque on the camshaft because the nose portion N of the lobe L will contact the contactor at a point P3 which is aligned with the direction of movement of the valve V and the axis of rotation A of the camshaft. The variation in the torque experienced by the camshaft which carries a lobe as it rotates through a complete 360° cycle is illustrated by the curve in FIG. 2 in which the horizontal axis represent the angle of rotation, in degrees, and the vertical axis represent torque. This curve, assuming negligible friction, which is a substantially valid assumption for an engine having roller followers, approximates a sine curve.

The variations in torque which are experienced by a camshaft in turning through each of its 360° cycles, and which are illustrated in FIG. 1A-1D and 2, are utilized as an actuating force to actuate a variable camshaft timing arrangement in the system of FIGS. 3-16. In the arrangement of FIGS. 3-14 a crankshaft 22 has a sprocket 24 keyed thereto, and rotation of the crankshaft 22 during the operation of the engine in which it is incorporated, otherwise not shown, is transmitted to an exhaust camshaft 26, that is, a camshaft which is used to operate the exhaust valves of the engine, by a chain 28 which is trained around the sprocket 24 and a sprocket 30 which is keyed to the camshaft 26. Although not shown, it is to be understood that suitable chain tighteners will be provided to ensure that the chain 28 is kept tight and relatively free of slack. As shown, the sprocket 30 is twice as large as the sprocket 24. This relationship results in a rotation of the camshaft 26 at a rate of one-half that of the crankshaft 22, which is proper for a 4-cycle engine. It is to be understood that the use of a belt in place of the chain 28 is also contemplated.

Figure 6:
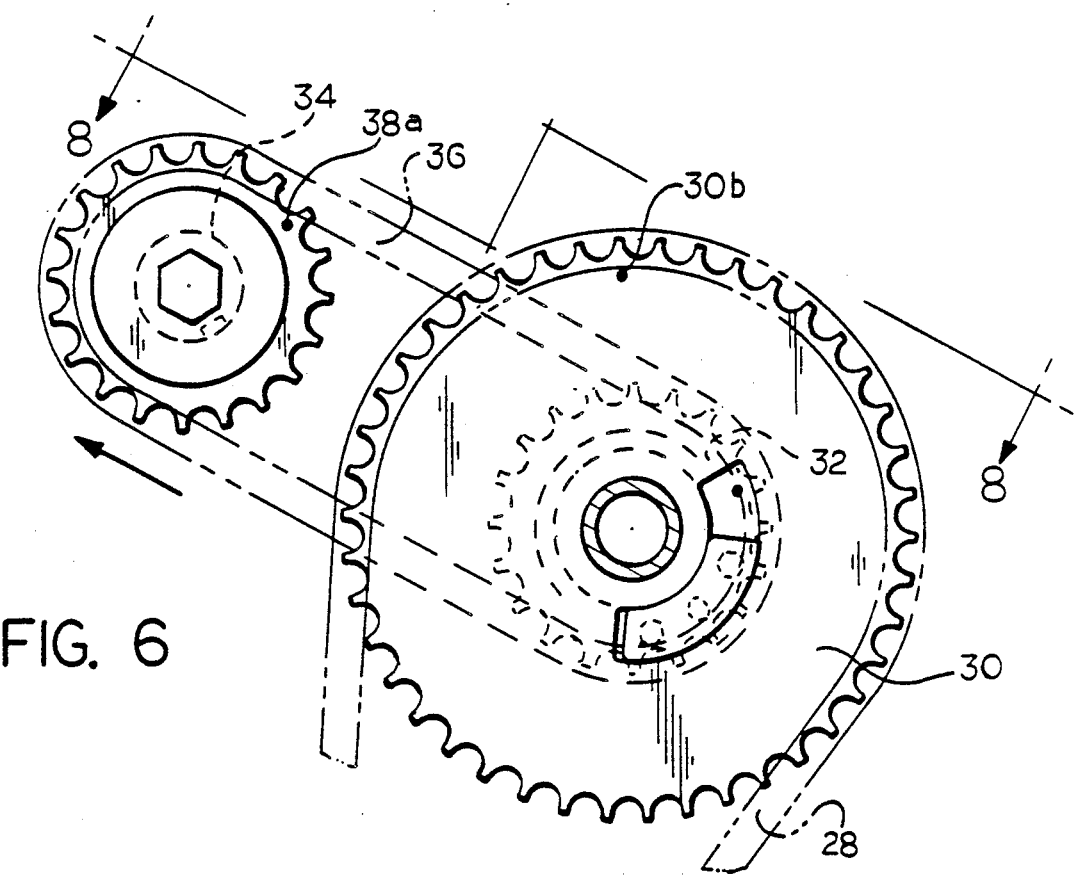
FIG. 6 is a fragmentary view similar to FIG. 5 showing the intake camshaft in an advanced position relative to the exhaust camshaft.
Figure 5:
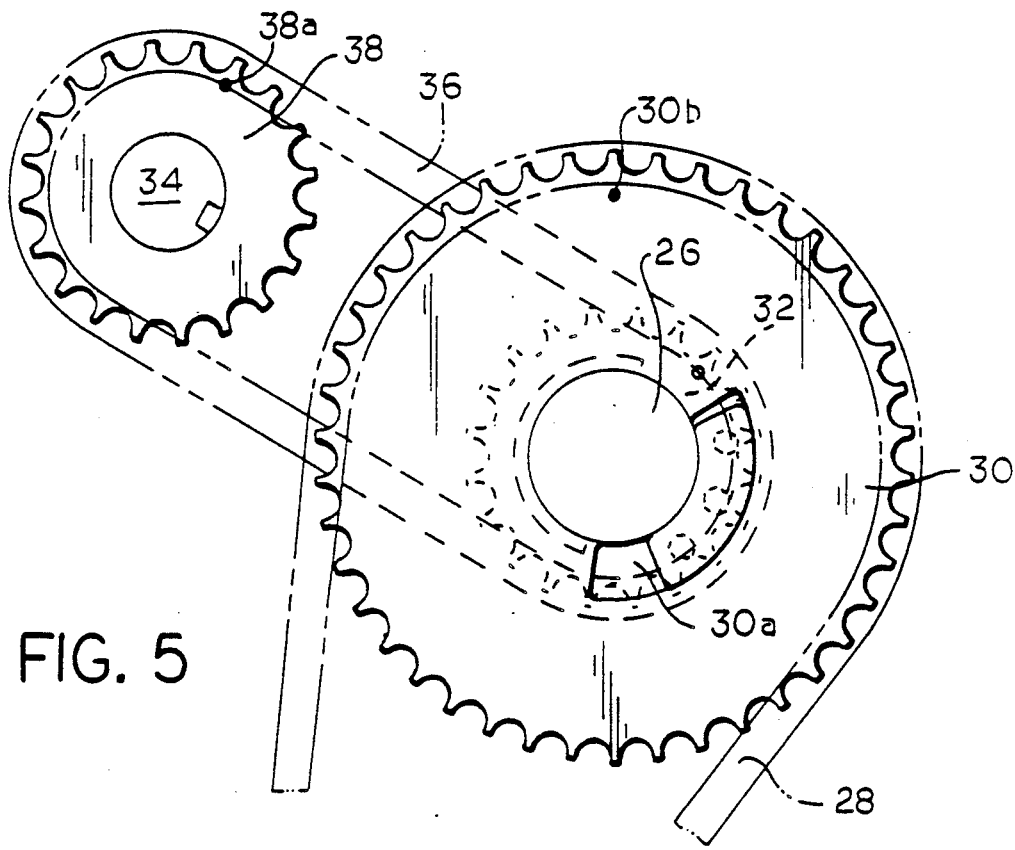
FIG. 5 is a fragmentary view taken on line 5—5 of FIG. 8 with some of the structure being removed for the sake of clarity and being shown in the retarded position of the device.
Figure 7:
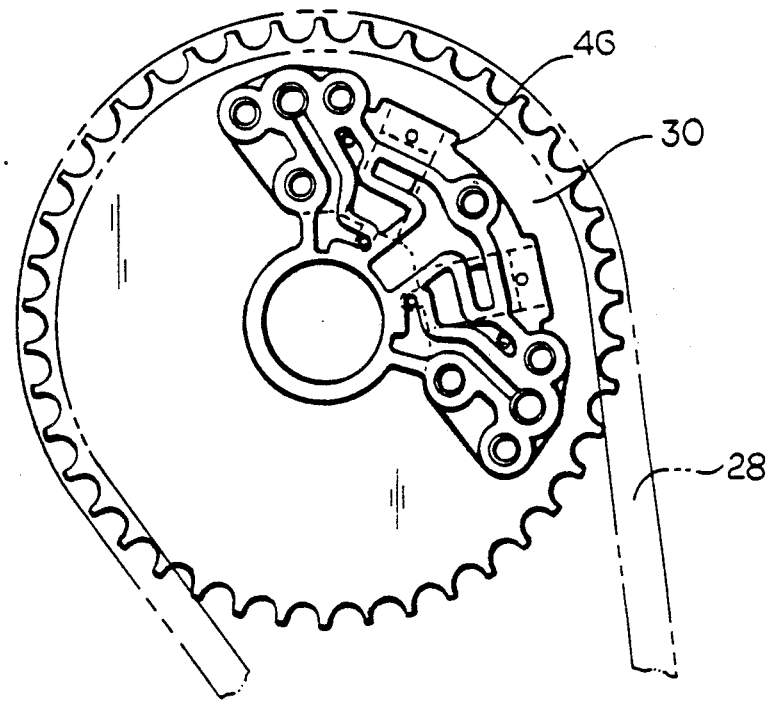
FIG. 7 is a fragmentary view showing the reverse side of some of the structure illustrated in FIG. 3.
Figure 9:
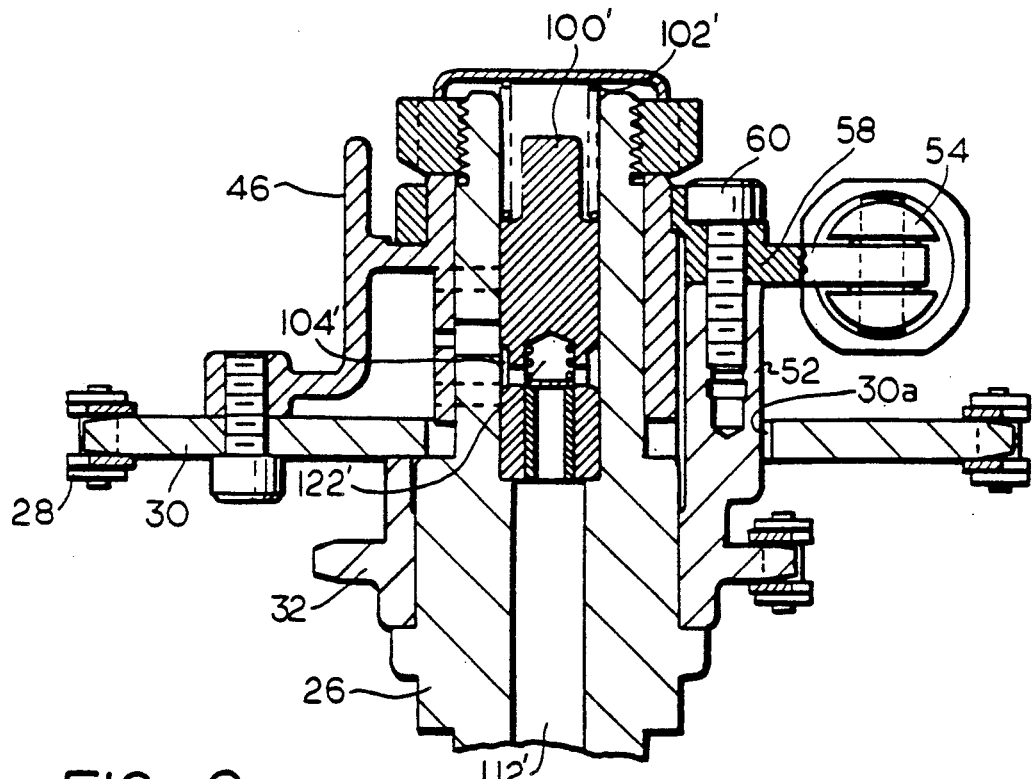
FIG. 9 is a fragmentary view taken on line 9—9 of FIG. 3.
Figure 10:
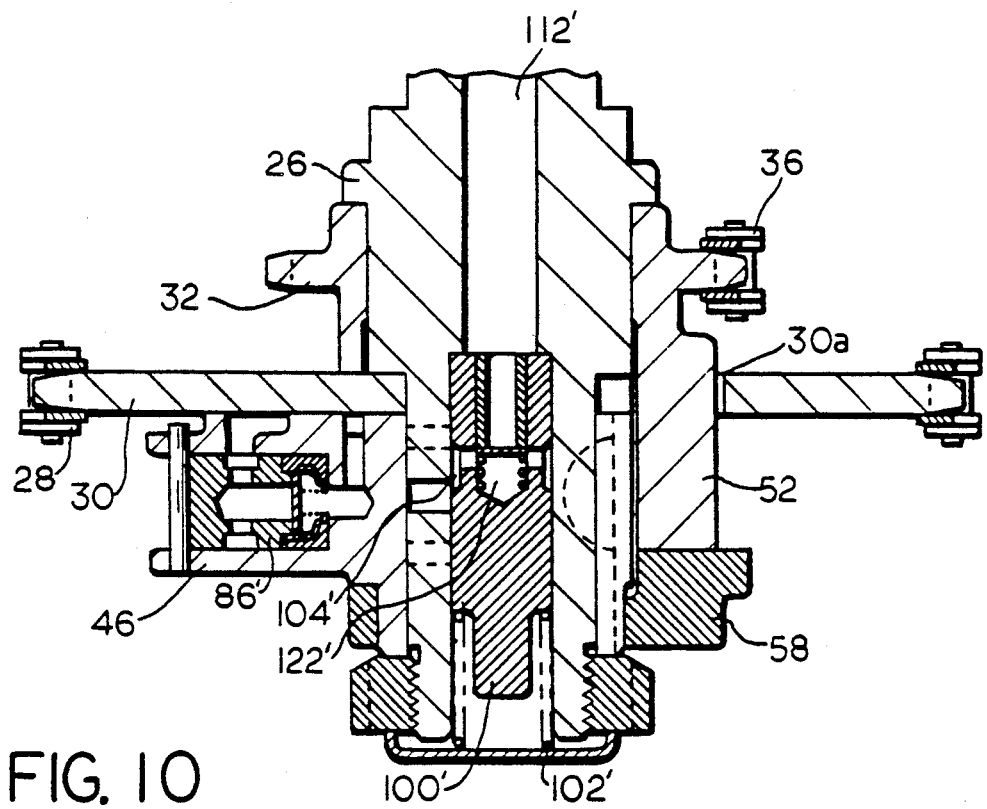
FIG. 10 is a sectional view taken on line 10—10 of FIG. 3.
Figure 11:
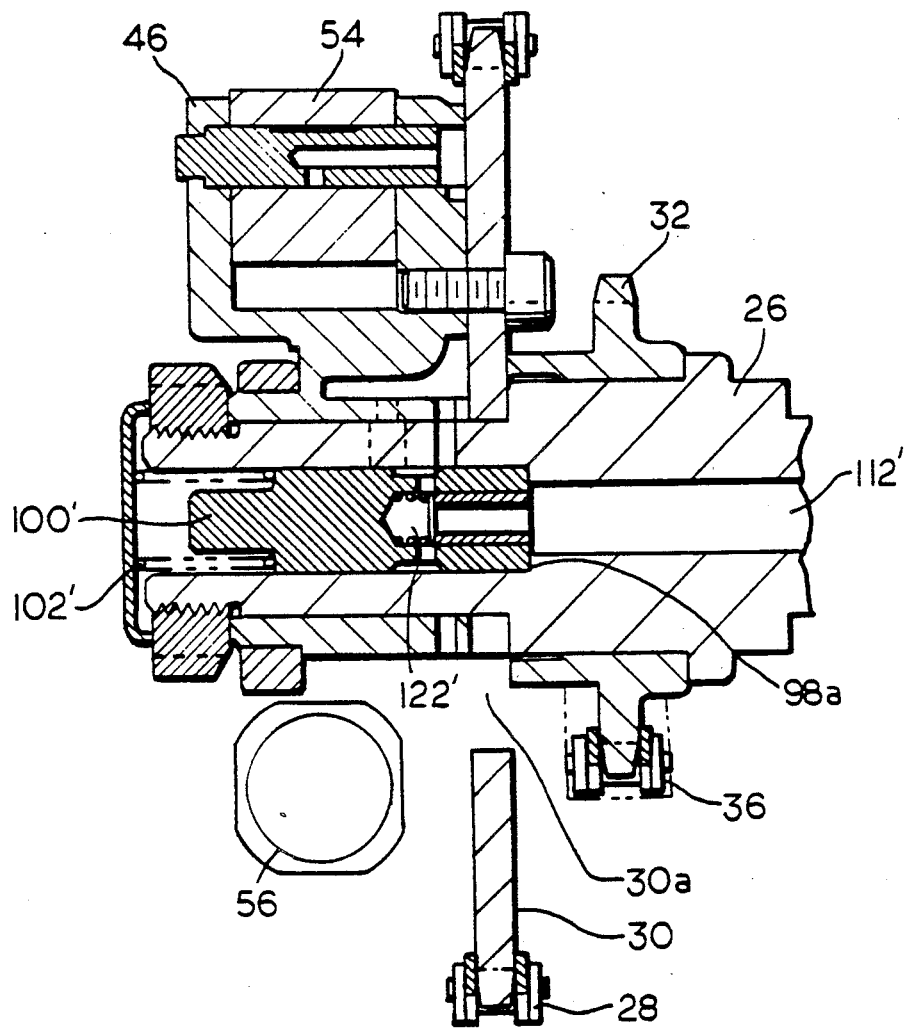
FIG. 11 is a sectional view taken on line 11—11 of FIG. 3.

The camshaft 26 carries another sprocket, sprocket 2, FIG. 5 and 6, journalled thereon to be oscillatable through a limited arc with respect thereto and to be otherwise rotatable with the camshaft 26. Rotation of the camshaft 26 is transmitted to an intake camshaft 34 by a chain 36 which is trained around the sprocket 32 and a sprocket 38 that is keyed to the intake camshaft 34. As shown, the sprockets 32 and 38 are equal in diameter to provide for equivalent rates of rotation between the camshaft 26 and the camshaft 34. The use of a belt in place of the chain 36 is also contemplated.

Figure 8:
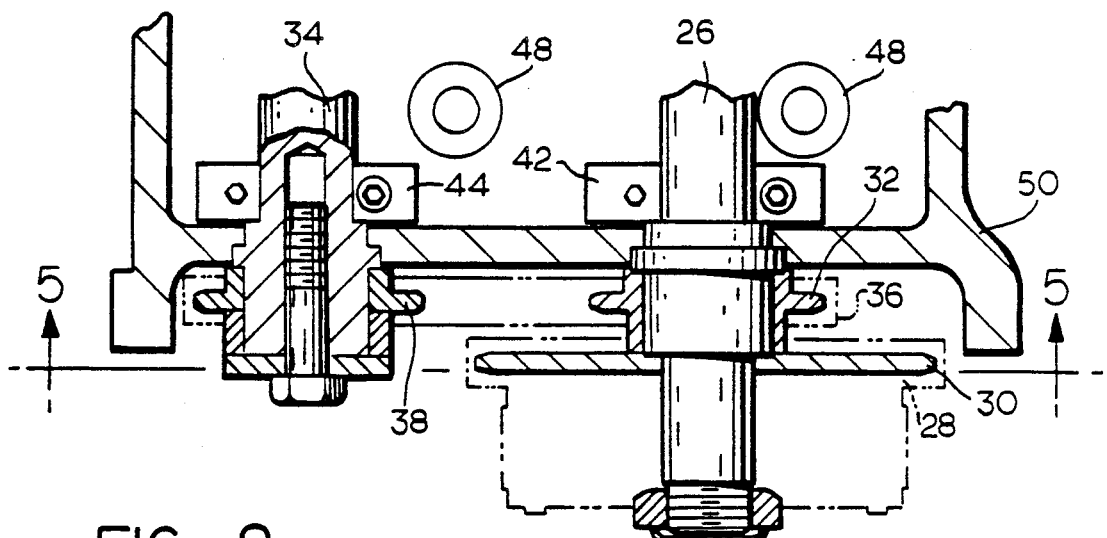
FIG. 8 is a fragmentary view taken on line 8—8 of FIG. 6.

As is illustrated in FIG. 8, an end of each of the camshafts 26 and 34 is journalled for rotation in bearings 42 and 44, respectively, of the head 50, which is shown fragmentarily and which is bolted to an engine block, otherwise not shown, by bolts 48. The opposite ends of the camshafts 26 and 34, not shown, are similarly journalled for rotation in an opposite end, also not shown, of the head 50. The sprocket 38 is keyed to the camshaft 34 at a location of the camshaft 34 which is outwardly of the head 50. Similarly, the sprockets 3Z and 30 are positioned, in series, on the camshaft 26 at locations outwardly of the head 50, the sprocket 32 being transversely aligned with the sprocket 38 and the sprocket 30 being positioned slightly outwardly of the sprocket 32, to be transversely aligned with the sprocket 24.

Figure 3:
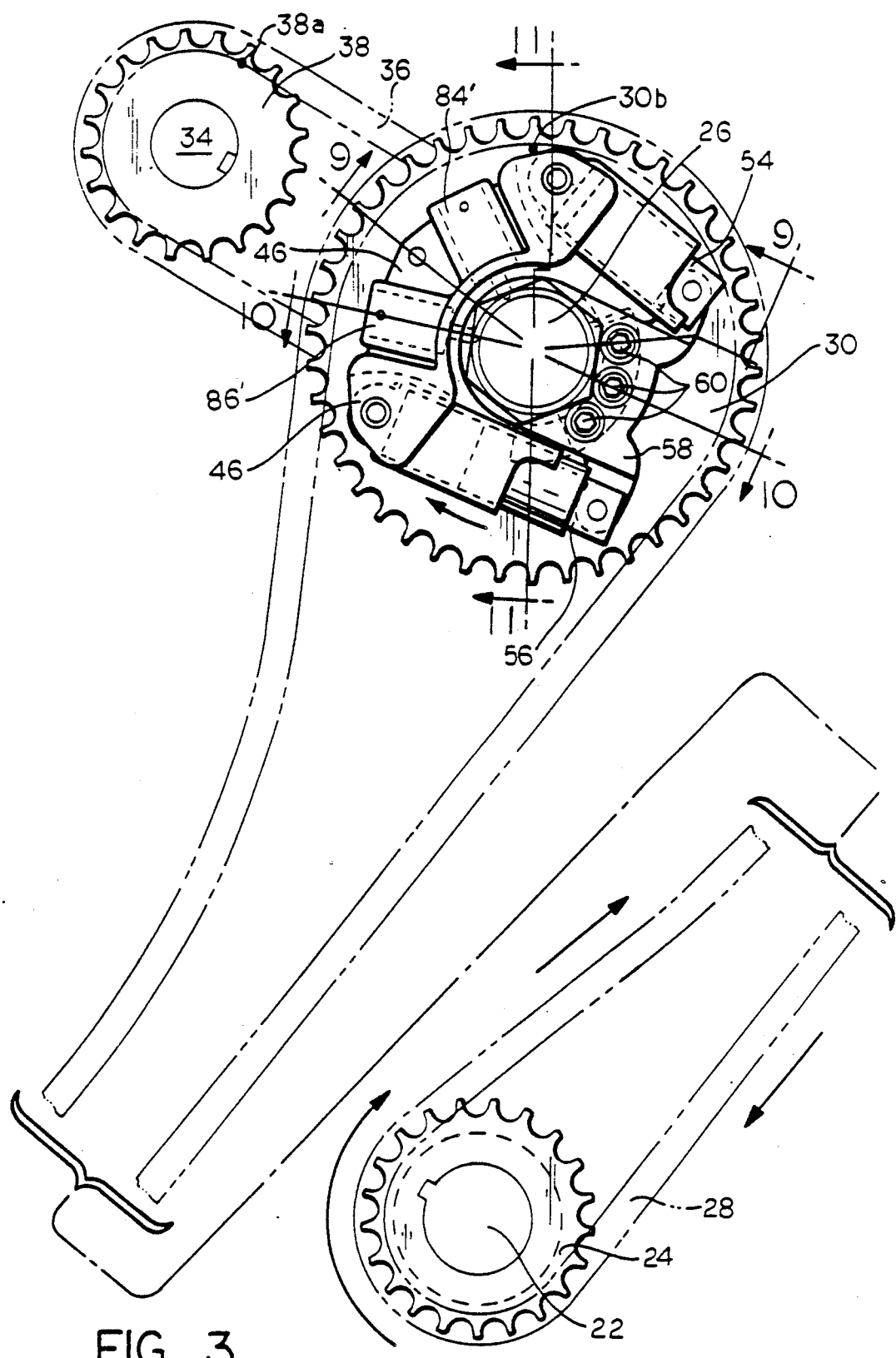
FIG. 3 is a fragmentary view of a dual camshaft internal combustion engine incorporating a preferred embodiment of a variable camshaft timing arrangement according to the present invention, the view being taken on a plane extending transversely through the crankshaft and the camshafts and showing the intake camshaft in a retarded position relative to the crankshaft and the exhaust camshaft.
Figure 4:
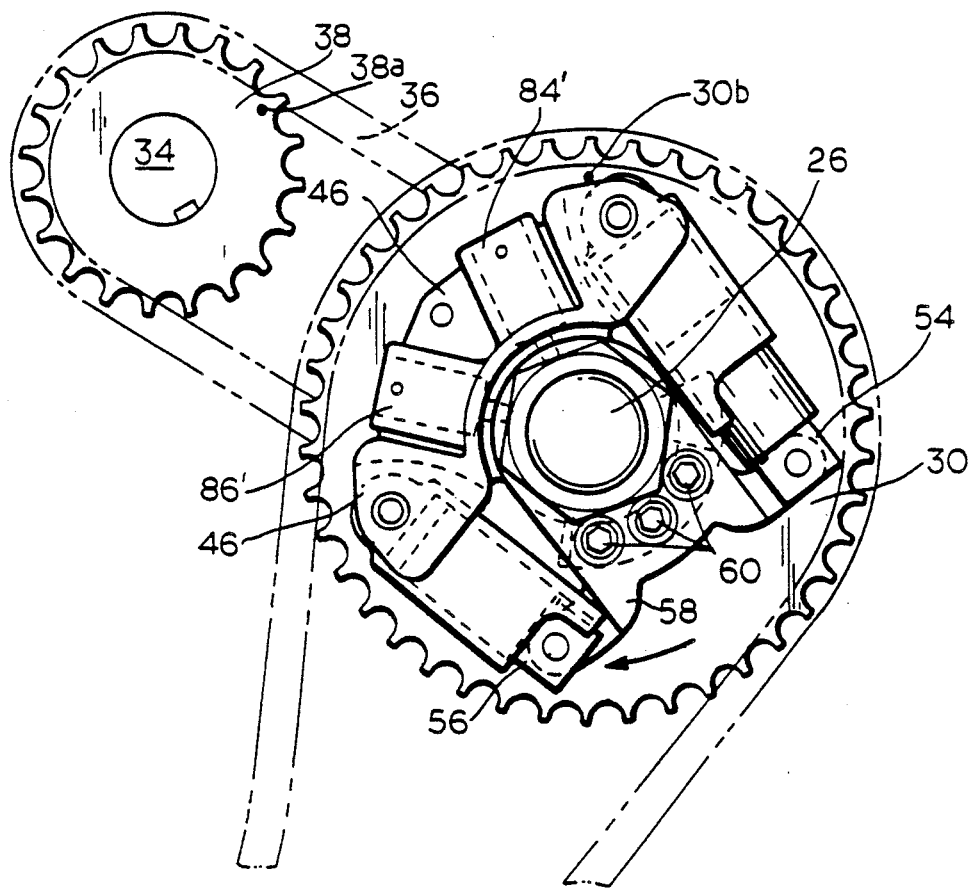
FIG. 4 is a fragmentary view similar to a portion of FIG. 3 showing the intake camshaft in an advanced position relative to the exhaust camshaft.
Figure 12:
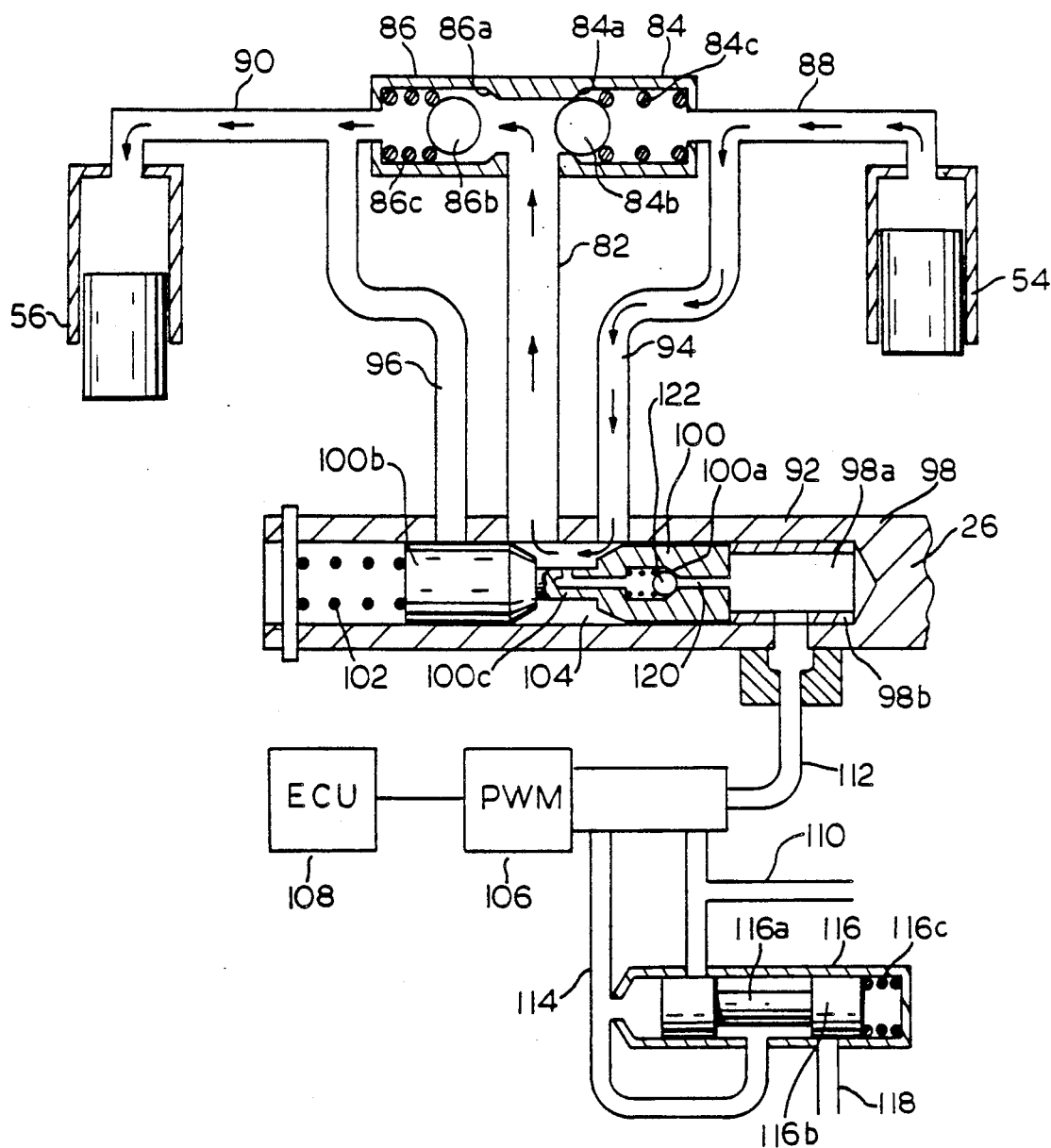
FIG. 12 is a schematic view of the hydraulic equipment of the variable camshaft timing arrangement according to the preferred embodiment and illustrates a condition where the camshaft phase is shifting in the direction of the retarded position of the arrangement which is illustrated in FIG. 3.
Figure 13:
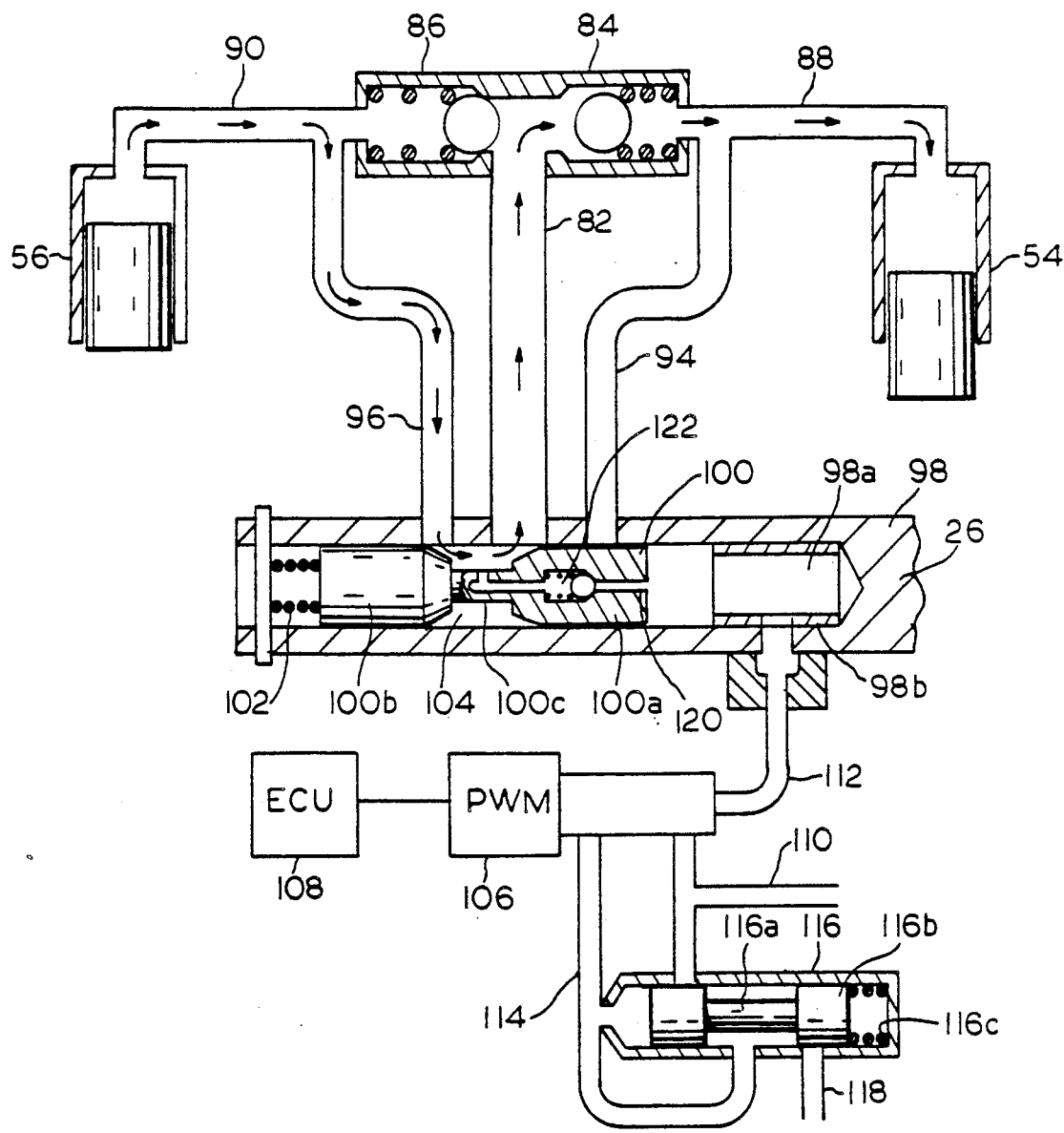
FIG. 13 is a schematic view similar to FIG. 12 and illustrates a condition where the camshaft is shifting in the direction of the advanced position of the variable camshaft timing arrangement which is illustrated in FIG. 4.
Figure 14:
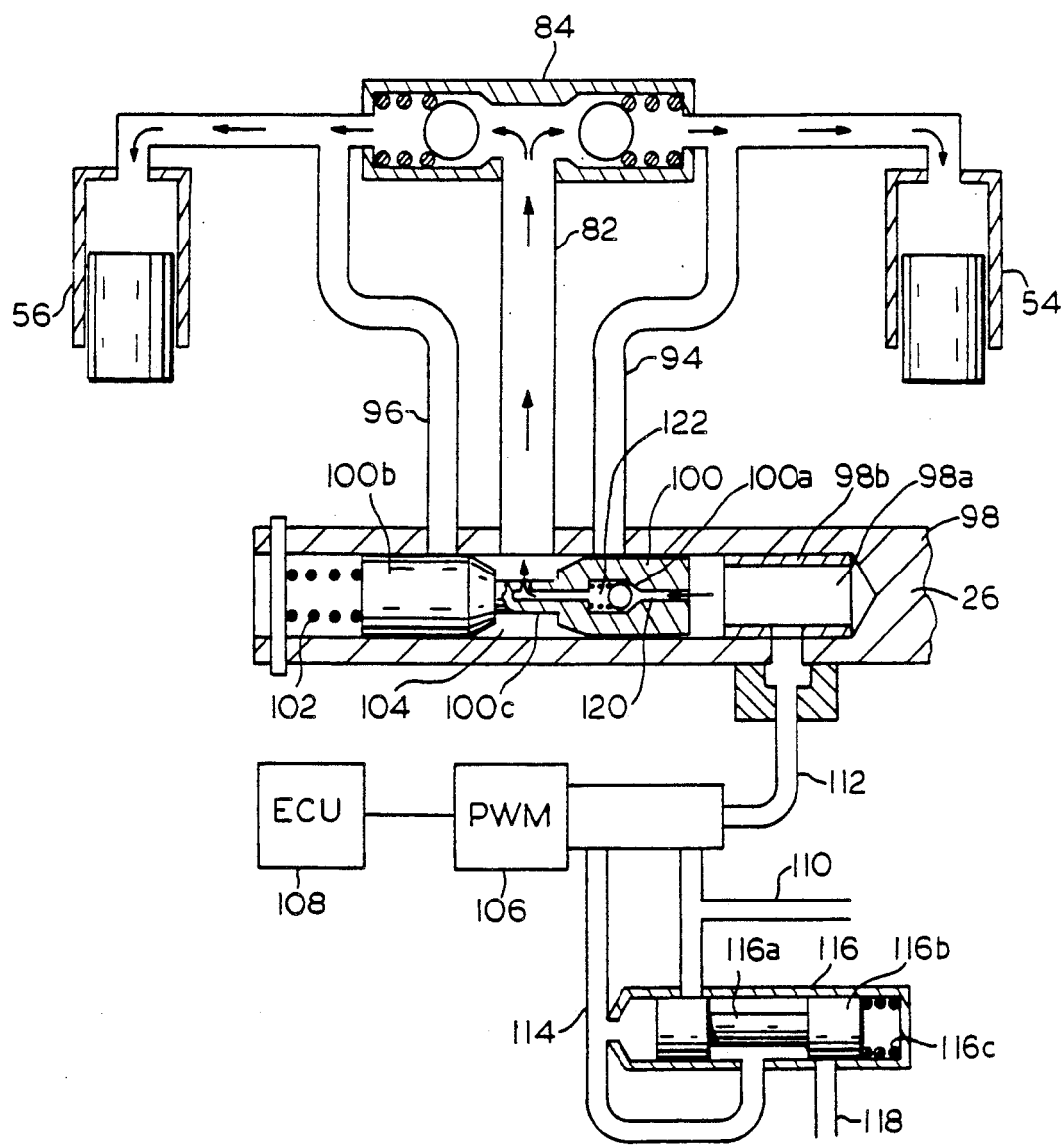
FIG. 14 is a schematic view similar to FIGS. 12 and 13 and illustrates a condition where the camshaft phase is being maintained in a position between the advanced position and the retarded position of the variable camshaft timing arrangement of the present invention.

The sprocket 32 has an arcuate retainer 52 (FIG. 10) as an integral part thereof, and the retainer 52 extends outwardly from the sprocket 32 through an arcuate opening 30a in the sprocket 30. The sprocket 30 has an arcuate hydraulic body 46 bolted thereto and the hydraulic body 46, which houses certain of the hydraulic components that are illustrated in FIGS. 12-14, receives and pivotably supports the body end of each of a pair of oppositely acting, single acting hydraulic cylinders 54 and 56 which are positioned on opposite sides of the longitudinal axis of the camshaft 26. The piston ends of the cylinders 54 and 56 are pivotably attached to an arcuate bracket 58, and the bracket 58 is secured to the sprocket 32 by a plurality of threaded fasteners 60. Thus, by extending one of the cylinders 54 and 56 and by simultaneously retracting the other of the cylinders 54 and 56, the arcuate position of the sprocket 32 will be changed relative to the sprocket 30, either to advance the sprocket 32 if the cylinder 54 is extended and the cylinder 56 is retracted, which is the operation condition illustrated in FIGS. 4, 6, and 13, or to retard the sprocket 32 relative to the sprocket 30 if the cylinder 56 is extended and the cylinder 54 is retracted, which is the operating condition illustrated in FIGS. 3, 5, 9, 10 and 12. In either case, the retarding or advancing of the position of the sprocket 32 relative to the position of the sprocket 30 will advance or retard the position of the camshaft 34 relative to the position of the camshaft 26 by virtue of the chain drive connection provided by the chain 36 between the sprocket 32, which is journalled for limited relative arcuate movement on the camshaft 26, and the sprocket 38, which is keyed to the camshaft 34. This relationship can be seen in the drawing by comparing the relative position of a timing mark 30b on the sprocket 30 and a timing mark 38a on the sprocket 38 in the retard position of the camshaft 34, as is shown in FIGS. 3 and 5, to their relative positions in the advanced position of the camshaft 34, as is shown in FIGS. 4 and 6.

The flow of hydraulic fluid, which is in the form of engine lubricating oil, into and out of the cylinders 54 and 56 is schematically illustrated in FIGS. 12-14, in which the cylinders 54 and 56 receive fluid by way of a common inlet line 8Z. The inlet line terminates at a juncture between opposed check valves 84 and 86 which are connected to the cylinders 54 and 56, respectively, by branch lines 88 and 90, respectively. The check valves 84 and 86 have annular seats 84a and 86a to permit the flow of hydraulic fluid through the check valves 84 and 86 into the cylinders 54 and 56, respectively. The flow of hydraulic fluid through the check valves 84 and 86 is blocked by floating balls 84b and 86b, respectively, which are resiliently urged against the seats 84a and 86a, respectively, by springs 84c and 86c, respectively. The check valves 84 and 86, thus, permit the initial filling of the cylinders 54 and 56 and provide for a continuous supply of make-up hydraulic fluid to compensate for leakage therefrom. Hydraulic fluid enters the line 82 by way of a spool valve 92, which is incorporated within the camshaft 26 in the embodiment of FIGS. 3-11, and hydraulic fluid is returned to the spool valve 92 from the cylinders 54 and 56 by return lines 94 and 96, respectively.

The spool valve 92 is made up of a cylindrical member 98 and a spool 100 which is slidable to and from within the member 98. The spool 100 has cylindrical lands 100a and 100b on opposed ends thereof, and the lands 100a and 100b, which fit snugly within the member 98, are positioned so that the land 100b will block the exit of hydraulic fluid from the return line 96, as is shown in FIG. 12, where the camshaft 34 is shifting in the direction of its retarded position, or the land 100a will block the exit of hydraulic fluid from the return line 94, as is shown in FIG. 13 where the camshaft 34 is shifting in the direction of its advanced position, or the lands 100a and 100b will block the exit of hydraulic fluid from both the return lines 94 and 96, as is shown in FIG. 14, where the camshaft 34 is being maintained in a selected intermediate position.

The position of the spool 100 within the member 98 is influenced by a spring 102 which acts on the end of the land 100b. Thus, the spring 102 resiliently urges the spool 100 to the right, in the orientation illustrated in FIGS. 12-14. The position of the spool 100 within the member 98 is further influenced by a supply of pressurized hydraulic fluid within a portion 98a of the member 98, on the outside of the land 100a, which urges the spool 100 to the left, the movement of the spool 100 to the right being limited by a sleevelike mechanical stop 98b within the right hand end position of the cylindrical member 98. The retraction of one or another of the cylinders 54 and 56, with a resulting extension of the other of such cylinders, results from the unblocking of either the return line 94 or the return line 96, as heretofore described, since the hydraulic fluid which passes through such return line will flow into the inlet line 82 by way of an annular space 104 which is defined by the inside of the member 98 and the outside of a reduced diameter portion 100c of the spool 100, which is positioned between the lands 100a and 100b. Thus, the expansion of the expanding cylinder 54 or 56 results from a transfer of hydraulic fluid directly thereto from the contracting cylinder 56 or 54, and does not add to the required size of the engine lubricating oil pump.

The pressure within the portion 98a of the cylindrical member 98 is controlled by a pressure control signal from a controller 106, preferably of the pulse width modulated type (PWM), in response to a control signal from an electronic engine control unit (ECU) 108, shown schematically, which may be of conventional construction. The controller 106 receives engine oil from the main oil gallery of the engine through an inlet line 110 and selectively delivers engine oil from such source to the portion 98a of the cylindrical member 98 through a supply line 112. Spent oil from the controller 106 is returned by way of an outlet line 114 to a low pressure regulator valve 116, which also receives supply oil from inlet line 110, and oil from the low pressure regulator valve 116 is returned to the engine oil sump by way of an outlet line 118. Flow through the outlet line 118 is blocked by a land 116b on a sliding spool 116a of the pressure regulator valve 116 unless the pressure in the line 114 is sufficient to overcome the biasing effect of a spring 116c. Thus, the low pressure regulator valve 116 serves to maintain a minimum oil pressure, for example, 15 p.s.i.g., in the portion 98a of the cylindrical member 98, notwithstanding an electrical or other failure of the controller 106, to thereby maintain a supply of hydraulic fluid to the cylinders 54 and 56 to make-up for leakage losses. Because of this minimum oil pressure, the cylinders 54 and 56 can be designed for a continuing low level of oil leakage therefrom, back to the engine oil compartment, thus eliminating the need for an expensive zero leakage seal design in the cylinders. The make-up oil for the cylinders 54 and 56 to compensate for such continuing oil leakage comes from the portion 98a of the cylindrical member 98 by way of a small, internal passage 120 within the spool 100, from the portion 98a of the cylindrical member 98 to the annular space 104, from which it can flow to the cylinders 54 and 56 by way of the inlet line 82. A check valve 122 is placed in the internal passage 120 to block the flow of oil from the space 104 to the portion 98a of the cylindrical member 98. The elements of the embodiment of FIG. 3-11 which correspond to the elements of the schematic hydraulic diagram of FIGS. 12-14, other than the cylinders 54 and 56, are identified by prime numerals, for example, the inlet line of the embodiment of FIGS. 3-11 which corresponds to the inlet line 82 of FIGS. 12-14 is identified by reference numeral 82'. In that regard, it is noted that the check valves 84' and 86' of the embodiment of FIGS. 3-11 are of the disc type, whereas the check valves 84 and 86 of FIGS. 12-14 are of the ball type, either type being acceptable.

The cylinders 54 and 56 are arranged to resist the positive and negative torque pulses in the camshaft 34 and are alternately pressurized thereby, because every force is resisted by an equal and oppositely directed reaction force. Such cyclical pressurizing of the cylinders 54 and 56 is converted to hydraulic flow, and to a change in position of the sprocket 32 relative to the sprocket 30, by the controlled positioning of the spool 100 with the cylindrical member of the spool valve 92 and by the flow direction sensitivity of the check valves 84 and 86.

Referring to FIG. 12, the cylinder 54 is pressurized during positive torque pulses in the camshaft 34 and the cylinder 56 is pressurized during negative torque pulses. The position of the spool 100 allows hydraulic fluid to flow out of the retracting cylinder 54 (during a positive torque pulse), through the passage 88, the passage 94, the cavity 104, the passage 82, the check valve 86 and the passage 90 into the extending cylinder 56. When the torque pulse becomes negative, the cylinder 56 is pressurized, but the fluid is not allowed to flow out of the cylinder 56 because the check valve 86 closes and blocks backflow through the passage 82 and the land 100b blocks fluid flow through the passage 96. Therefore, with the cylinder 54 being allowed to retract and the cylinder 56 only being allowed to extend, the variable camshaft timing mechanism causes the camshaft 34 to move in the retarded timing direction relative to the position of the crankshaft 22.

FIG. 13 illustrates a condition in which the position of the camshaft 34 is advanced relative to the position of the crankshaft 22. The position of the spool 100 allows hydraulic fluid to flow out of the retracting cylinder 56 (during a negative torque pulse), through the passage 90, the passage 96, the cavity 104, the passage 82, the check valve 84 and the passage 88 into the extending cylinder 54. When the torque in the crankshaft 34 becomes positive, the cylinder 54 is pressurized, but the fluid is not allowed to flow out of the cylinder 54 because the check valve 84 closes and blocks backflow through the passage 82 and the land 100a blocks fluid flow through passage 94 Therefore, with the cylinder 56 being allowed to retract and the cylinder 54 only being allowed to extend, the variable camshaft timing mechanism causes the camshaft 34 to move in the advanced timing direction relative to the position of the crankshaft 22.

FIG. 14 illustrates a condition in which the spool 100 is in the neutral position. The land 100b prevents hydraulic fluid from exiting the cylinder 56 by blocking the exit passage 96. The check valve 86 also prevents fluid from leaving the cylinder 56, but allows makeup fluid to flow into the cylinder 56 to compensate for any leakage. Similarly, the land 100a prevents hydraulic fluid from exiting the cylinder 54 by blocking the exit passage 94. The check valve 84 also prevents fluid from leaving the cylinder 54, but allows makeup fluid to flow into the cylinder 54 to compensate for any leakage. Thus, by preventing flow from both cylinders, which prevents the cylinders 54 and 56 from retracting, the camshaft is "locked" in a selected intermediate position of the camshaft 34 relative to the crankshaft 22.

As is illustrated in FIGS. 12 and 13, the spool valve 100 is in the fully open position, allowing the hydraulic fluid to flow at its maximum rate from cylinder to cylinder, thus representing the maximum rate of change of the camshaft timing relative to the crankshaft. If desired, the spool valve 100 can be partially opened, allowing the hydraulic fluid to flow at a reduced rate, limiting the rate of change of camshaft timing. Therefore, camshaft timing position and the rate of change of camshaft timing position are controllable by the same valve.

Figure 15:
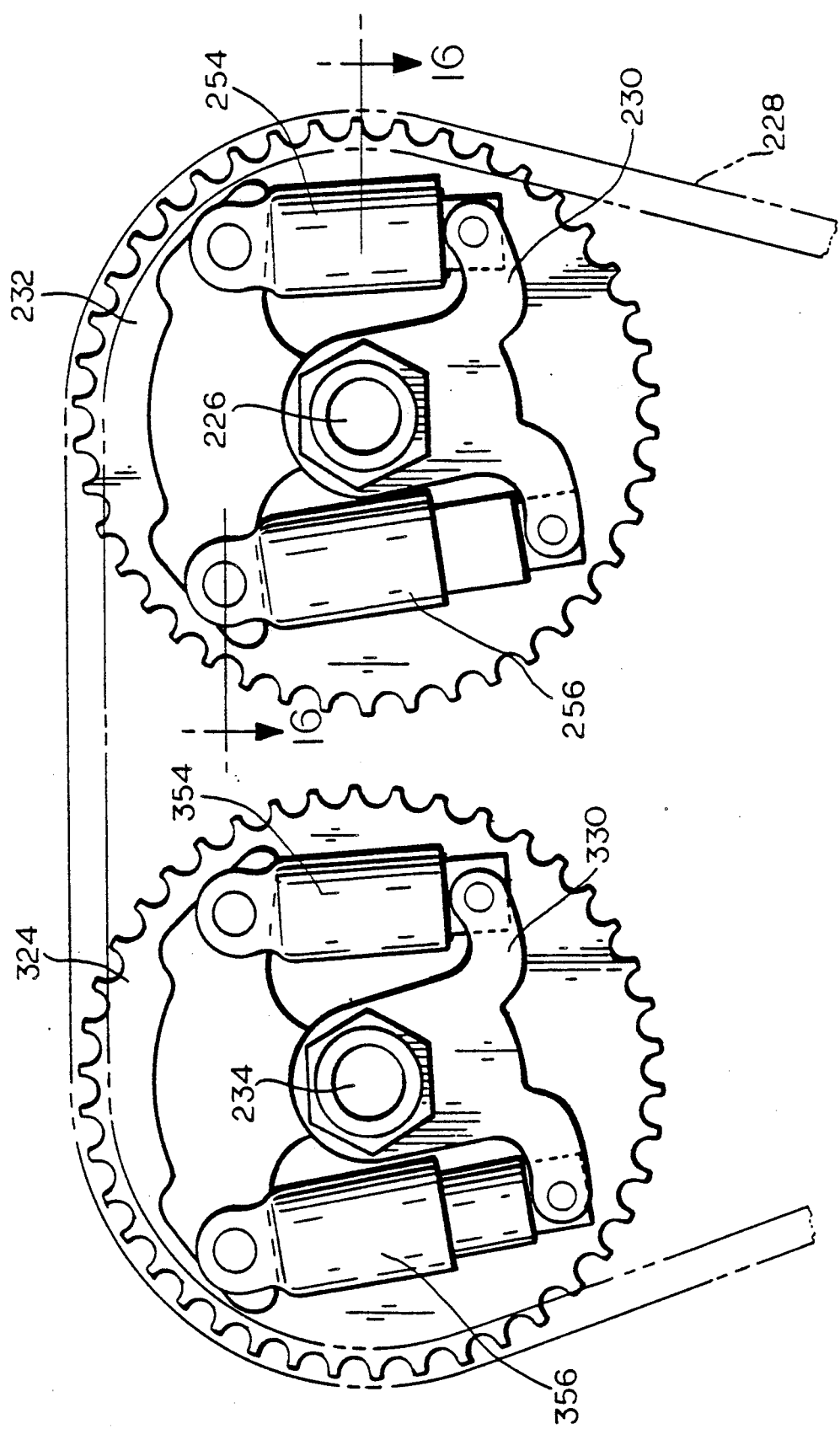
FIG. 15 is a fragmentary view of a dual camshaft internal combustion engine incorporating an alternative embodiment of the present invention.
Figure 16:
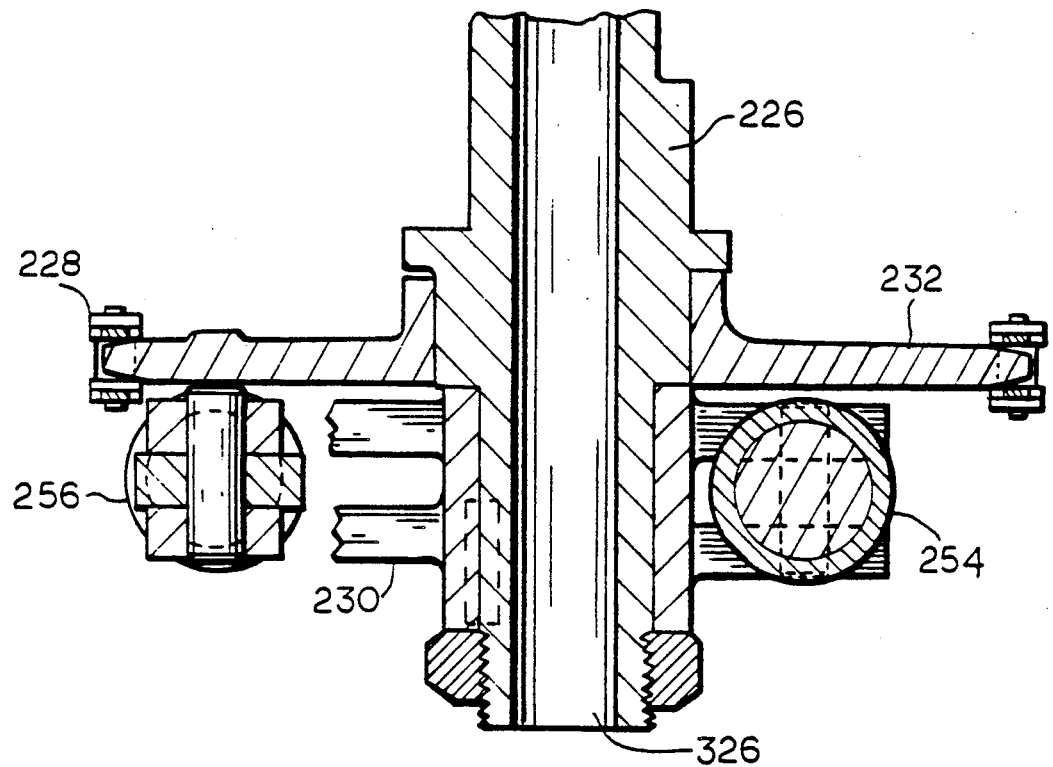
FIG. 16 is a sectional view taken on line 16—16 of FIG. 15.

FIGS. 15 and 16 illustrate schematically an embodiment of the present invention in which the
principle of the embodiment of FIGS. 3-14 is adapted to the phasing of either or both of the camshafts of a dual camshaft engine relative to one another or relative to the crankshaft. In this embodiment a chain 228, which is shown fragmentarily and which is driven by a crankshaft, not shown, is trained both around a sprocket 232, which is journalled on an exhaust camshaft 226 to be oscillatable through a limited arc with respect thereto and to be otherwise rotatable therewith, and around a sprocket 324 which is similarly journalled on an intake camshaft 234. The body ends of single acting hydraulic cylinders 254 and 256 are pivotably attached to the sprocket 232, on opposite sides of the camshaft 226, and the piston ends of the cylinders 254 and 256 are pivotably attached to a bracket 230 which is keyed to the camshaft 226. The cylinders 254 and 256 are controllably hydraulically interconnected as in the manner of the cylinders 54 and 56 of the embodiment of FIGS. 3-18. Thus, the extending of one or another of the cylinders 254 and 256, with the concurrent retracting of the other of such cylinders, will advance or retard, as the case may be, the position of the camshaft 226 relative to the crankshaft, not shown, which is driving the chain 228. Likewise, the body ends of single acting hydraulic cylinders 354 and 356 are pivotably attached to the sprocket 324, on opposite sides of the camshaft 234, and the piston ends of the cylinders 354 and 356 are pivotably attached to a bracket 330 which is keyed to the camshaft 234. The cylinders 354 and 356 are controllably hydraulically interconnected in the manner of the cylinders 54 and 56 of the embodiment of FIG. 3-14, to operate in unison with, or independently of, the cylinders 254 and 256. Thus, the extending of one or another of the cylinders 354 and 356, with the concurrent retracting of the other of such cylinders, will advance or retard, as the case may be, the position of the camshaft 234 relative to the crankshaft. Depending on the manner of controlling the actuation of the cylinders 254 and 256, on the one hand, and the cylinders 354 and 356, on the other hand, the advancing and retarding of the camshaft 234 will be in unison with, or independent of, the advancing and retarding of the camshaft 226. The hydraulic system for the embodiment of FIGS. 15 and 16 is not shown in such figures, but it is to be understood that it is the same as the hydraulic system of FIGS. 3-14.

It is further to be understood that it is within the contemplation of the inventors that the actuating system for actuating the phasing of a camshaft relative to a crankshaft which has been described herein can be adapted to a variable camshaft timing system of the type disclosed in U.S. Pat. No. 4,862,845 (R. P. Butterfield and F. R. Smith), the disclosure of which is hereby incorporated herein by reference.

Although the best mode contemplated by the inventors for carrying out the present invention as of the filing date hereof has been shown and described herein, it will be apparent to those skilled in the art that suitable modifications, variations, and equivalents may be made without departing from the scope of the invention, such scope being limited solely by the terms of the following claims.

What is claimed is:

1. In an internal combustion engine having a crankshaft, at least one camshaft, the at least one camshaft being position variable relative to the crankshaft and being subject to torque reversals during the operation thereof, and means for varying the position of the at least one camshaft relative to the crankshaft, the method comprising:
   actuating means for varying the position of the at least one camshaft relative to the crankshaft in reaction to torque reversals in the at least one camshaft.

2. In an internal combustion engine having a crankshaft, at least one camshaft, the at least one camshaft being position variable relative to the crankshaft and being subject to torque reversals, the method comprising:
   providing oppositely acting first and second hydraulic means for varying the position of the at least one camshaft;
   varying the position of the at least one camshaft relative to the crankshaft by transferring hydraulic fluid from one of the first and second hydraulic means to the other of the first and second hydraulic means; and
   actuating the first and second hydraulic means for varying the position of the at least one camshaft relative to the crankshaft in reaction to torque reversals in the at least one camshaft.

3. The method of claim 2 wherein the first and second hydraulic means are first and second oppositely acting hydraulic cylinders, and wherein the transferring of hydraulic fluid from one of the first and second hydraulic means to the others of the first and second hydraulic means is accomplished by providing valve means for selectively permitting flow out of one or another of the first and second hydraulic means into an inlet line leading to the other of the first and second hydraulic means, and further by providing check valve means in the inlet line for permitting hydraulic fluid to flow therethrough only into the other of the first and second hydraulic means.

4. In an internal combustion engine having a crankshaft, at least one camshaft, and an engine control unit for controlling the operation of the engine, the at least one camshaft being position variable relative to the crankshaft and being subject to torque reversals, the method of varying the position of the at least one camshaft relative to the crankshaft comprising:
   actuating, in response to a control signal from the engine control unit, the means for varying the position of the at least one camshaft in reaction to torque reversals in the at least one camshaft.

5. The method according to claim 4 wherein the step of actuating is performed by:
   providing oppositely acting first and second hydraulic means for varying the position of the at least one camshaft; and
   transferring hydraulic fluid from one of the first and second hydraulic means to the other of the first and second hydraulic means when permitted by a control signal from the engine control unit.

6. The method according to claim 5 wherein the first and second hydraulic means are first and second oppositely acting hydraulic cylinders, and wherein the transferring of hydraulic fluid from one of the first and second hydraulic means to the others of the first and second hydraulic means is accomplished by providing a valve for selectively permitting flow out of one or another of the first and second hydraulic means into an inlet line leading to the other of the first and second hydraulic means, and further by providing check valve means in the inlet line for permitting hydraulic fluid to flow therethrough only into the other of the first and second hydraulic means.

7. An internal combustion engine comprising:
   a crankshaft;
   at least two camshafts, each of said at least two camshafts being rotatable about its longitudinal central axis;
   first means mounted on a first of said at least two camshafts, said first means being oscillatable with respect to said first of said at least two camshafts about the longitudinal central axis of said first of said at least two camshafts at least through a limited arc;
   second means keyed to said first of said at least two camshafts for rotation therewith;
   rotary movement transmitting means interconnecting said crankshaft and one of said first means and said second means for transmitting rotary movement from said crankshaft to said first of said at least two camshafts;
   a first hydraulic cylinder having a body end pivotably attached to one of said first means and said second means and a piston end pivotably attached to the other of said first means and said second means;
   a second hydraulic cylinder having a body end pivotably attached to said one of said first means and said second means and a piston end pivotably attached to said other of said first means and said second means, said second hydraulic cylinder and said first hydraulic cylinder being disposed to act in opposite directions with respect to the longitudinal central axis of said first of said at least two camshafts and being hydraulically interconnected so that one of said first hydraulic cylinder and said second hydraulic cylinder extends as the other of said first hydraulic cylinder and said second hydraulic cylinder retracts; and control means for selectively permitting the extending of one of said first hydraulic cylinder and said second hydraulic cylinder and the retracting of the other of said first hydraulic cylinder and said second hydraulic cylinder in reaction to torque pulsations in one of said least two camshafts to thereby advance or retard the rotational position of said one of said at least two camshafts relative to said crankshaft.

8. An internal combustion engine according to claim 7 wherein one of said first means and said second means is a sprocket, wherein said rotary movement transmitting means is a chain and wherein said sprocket is driven by said chain.

9. An internal combustion engine comprising:
a crankshaft;
at least two camshafts, each of said at least two camshafts being rotatable about its longitudinal central axis;
first means mounted on one of said at least two camshafts, said first means being oscillatable with respect to said one of said at least two camshafts about the longitudinal central axis of said one of said at least two camshafts at least through a limited arc;
second means keyed to said first of said at least two camshafts for rotation therewith;
chain means interconnecting said crankshaft and one of said first means and said second means for transmitting rotary movement from said crankshaft to said first of said at least two camshafts;
a first hydraulic cylinder having a body end pivotably attached to one of said first means and said second means and a piston end pivotably attached to the other of said first means and said second means;
a second hydraulic cylinder having a body end pivotably to said one of said first means and said second means and a piston end pivotably attached to said other of said first and said second means, said first hydraulic cylinder and said second hydraulic cylinder being disposed to act in opposite directions with respect to the longitudinal central axis of said first of said at least two camshafts;
hydraulic means interconnecting said first hydraulic cylinder and said second hydraulic cylinder so that one of said first hydraulic cylinder and said second hydraulic cylinder extends as the other of said first hydraulic cylinder and said second hydraulic cylinder retracts, said hydraulic means including control valve means for permitting one or another of said first hydraulic cylinder and said second hydraulic cylinder to extend and the other of said first hydraulic cylinder and said second hydraulic cylinder to retract in reaction to torque pulsations in one of said at least two camshafts to thereby advance or retard the rotational position of said one of said at least two camshafts relative to said crankshaft; and
control means for controlling the operation of said control valve means.

10. An internal combustion engine according to claim 9 wherein one of said first means and said second means is a sprocket.

11. An internal combustion engine according to claim 10 wherein said control valve means comprises spool valve means comprising a cylindrical chamber and a spool member, said spool member being slidable within said chamber and having first and second spaced apart lands for selectively blocking hydraulic flow outwardly from one or another or both of said first hydraulic cylinder and said second hydraulic cylinder, said spool valve means further comprising means for biasing said spool member in a first direction, said control means selectively acting on said spool member to bias it in the opposite direction.

12. An internal combustion engine according to claim 11 wherein said spool member further comprises an annular space between said spaced apart lands, wherein said hydraulic means includes an inlet line leading from said spool valve means to said first hydraulic cylinder and said second hydraulic cylinder, and wherein said annular space is in communication with said inlet line leading to said first hydraulic cylinder and said second hydraulic cylinder.

13. An internal combustion engine according to claim 12 wherein said inlet line leading to said first hydraulic cylinder and said second hydraulic cylinder comprises a first branch leading to said first hydraulic cylinder and a second branch leading to said second hydraulic cylinder, wherein said first branch comprises first check valve means for permitting hydraulic fluid to flow therethrough only into said first hydraulic cylinder, and wherein said second branch comprises second check valve means for permitting hydraulic fluid to flow therethrough only into said second hydraulic cylinder.

14. An internal combustion engine according to claim 13 wherein said control means comprises means for delivering hydraulic fluid at a variable pressure to a portion of said cylindrical chamber, said portion being in communication with an end of said spool to bias it in said opposite direction.

15. An internal combustion engine according to claim 14 wherein said spool member has an internal passage extending from said end to said annular space to provide for a continuing supply of hydraulic fluid to said annular space to make up for leakage from said first hydraulic cylinder or said second hydraulic cylinder.

16. An internal combustion engine according to claim 15 wherein said internal passage comprises an internal passage check valve for permitting hydraulic fluid to flow therethrough only from said portion of said cylindrical chamber to said annular space.

17. An internal combustion engine according to claim 16 wherein said hydraulic means further comprises low pressure regulator valve means for maintaining hydraulic fluid at a minimum pressure in said portion of said cylindrical chamber in the event of a failure of said control means.

18. An internal combustion engine comprising:
a crankshaft;
a first camshaft for operating the inlet valves of said engine; said first camshaft being rotatable about its longitudinal central axis;
a second camshaft for operating the exhaust valves of said engine, said second camshaft being rotatable about its longitudinal central axis;

a first sprocket mounted on said second camshaft, said first sprocket being keyed to said second camshaft;

a second sprocket mounted on said second camshaft, said second sprocket being oscillatable with respect to said second camshaft about said longitudinal central axis thereof at least through a limited arc;

a third sprocket mounted on said first camshaft, said third sprocket being keyed to said first camshaft;

a first chain interconnecting said crankshaft and said first sprocket for transmitting rotary movement from said crankshaft to said second camshaft;

a second chain interconnecting said second sprocket and said third sprocket for transmitting rotary movement from said second camshaft to said first camshaft;

a first hydraulic cylinder having a body end pivotably attached to said first sprocket and a piston end pivotably attached to said second sprocket;

a second hydraulic cylinder having a body end pivotably to said first sprocket and a piston end pivotably attached to said second sprocket, said first hydraulic cylinder and said second hydraulic cylinder being disposed to act in opposite directions with respect to said longitudinal central axis of said second camshaft;

hydraulic means interconnecting said first hydraulic cylinder and said second hydraulic cylinder so that one of said first hydraulic cylinder and said second hydraulic cylinder extends as the other of said first hydraulic cylinder and said second hydraulic cylinder retracts, said hydraulic means including control valve means for permitting one or another of said first hydraulic cylinder and said second hydraulic cylinder to extend and the other of said first hydraulic cylinder and said second hydraulic cylinder to retract in reaction to torque pulsations in one of said first camshaft and said second camshaft to thereby advance or retard the rotational position of said one of said first camshaft and said second camshaft relative to said crankshaft; and control means for controlling the operation of said control valve means.

19. An internal combustion engine according to claim 18 wherein said control valve means comprises spool valve means comprising a cylindrical chamber and a spool member, said spool member being slidable within said chamber and having first and second spaced apart lands for selectively blocking hydraulic flow outwardly from one or another or both of said first hydraulic cylinder and said second hydraulic cylinder, said spool valve means further comprising means for biasing said spool member in a first direction, said control means selectively acting on said spool member to bias it in the opposite direction.

20. An internal combustion engine according to claim 19 wherein said spool member further comprises an annular space between said spaced apart lands, wherein said hydraulic means includes an inlet line leading from said spool valve means to said first hydraulic cylinder and said second hydraulic cylinder, and wherein said annular space is in communication with said inlet line leading to said first hydraulic cylinder and said second hydraulic cylinder.

21. An internal combustion engine according to claim 20 wherein said inlet line leading to said first hydraulic cylinder and said second hydraulic cylinder comprises a first branch leading to said first hydraulic cylinder and a second branch leading to said second hydraulic cylinder, wherein said first branch comprises first check valve means for permitting hydraulic fluid to flow therethrough only into said first hydraulic cylinder, and wherein said second branch comprises second check valve means for permitting hydraulic fluid to flow therethrough only into said second hydraulic cylinder.

22. An internal combustion engine according to claim 21 wherein said control means comprises means for delivering hydraulic fluid at a variable pressure to a portion of said cylindrical chamber, said portion being in communication with an end of said spool to bias it in said opposite direction.

23. An internal combustion engine according to claim 22 wherein said spool member has an internal passage extending from said end to said annular space to provide for a continuing supply of hydraulic fluid to said annular space to make up for leakage from said first hydraulic cylinder or said second hydraulic cylinder.

24. An internal combustion engine according to claim 23 wherein said internal passage comprises an internal passage check valve for permitting hydraulic fluid to flow therethrough only from said portion of said cylindrical chamber to said annular space.

25. An internal combustion engine according to claim 24 wherein said hydraulic means further comprises low pressure regulator valve means for maintaining hydraulic fluid at a minimum pressure in said portion of said cylindrical chamber in the event of a failure of said control means.

26. An internal combustion engine according to claim 7 wherein said at least one camshaft and said a camshaft are one and the same.

27. An internal combustion engine according to claim 7 wherein said control means is responsive to torque pulsations in a second of said at least two camshafts, and further comprising:

drive means interconnecting said first means and said second of said at least two camshafts for synchronous rotation of said first means and said second of said at least two camshafts.

28. An internal combustion engine according to claim 7 wherein said control means is responsive to torque pulsations in said first of said at least two camshafts.

29. An internal combustion engine according to claim 9 wherein said control means is responsive to torque pulsations in a second of said at least two camshafts, and further comprising:

drive means interconnecting said first means and said second of said at least two camshafts for synchronous rotation of said first means and said second of said at least two camshafts.

30. An internal combustion engine according to claim 9 wherein said control means is responsive to torque pulsations in said first of said at least two camshafts.

* * * * *